UNITED STATES PATENT OFFICE 2,593,396

PROCESS FOR FIXING PHOTOGRAPH ON GLASS

Leslie Robert Dover Beck, Birmingham, England

No Drawing. Application February 6, 1950, Serial No. 142,718. In Great Britain February 7, 1949

1 Claim. (Cl. 41—42)

This invention relates to a process for fixing a gelatine mouldable sheet or film on the surface of a glass, the gelatine film having a representation, produced such as by a photographic or printing process, on one side which side is applied to the glass surface. It has for its object to decorate a glass table top or the like sheet with a representation so that it will be securely attached and so that it will not become detached by scratching or moisture. A further object is to fix and treat the film with the representation thereon so that it is in a hardened condition when applied in order that it will not readily be scratched or damaged. A still further object is to treat the underside or backside of a table top or glass sheet so that it presents the appearance of a piece of wood or other representation covered by a glass sheet and so that the table top will be as durable as an actual piece of wood covered by a glass sheet.

According to one convenient process, a sheet of the finest brass wire gauze obtainable, conveniently of a mesh three hundred to the inch, is heated to a temperature of 105° C. and is then brushed with paraffin wax, so that the wire is covered without closing the gauze openings formed by the wires. A sheet of glass to be covered by a photographic or printed film is heated to 80° C. and the gauze is pressed on the glass, the pressure being applied through a steel plate placed on the gauze, the surface of which plate having previously been brushed with a solution of lamp black heated to 80° C. and conveniently comprising ten parts by volume of water to ten parts by volume of lamp black. The parts are then allowed to cool after which the steel plate is removed leaving the gauze adhering to the glass. A 10% solution of hydrofluoric acid is then brushed over the gauze, so that the acid can pass through the large number of minute holes to very finely pit the glass. By thus treating the glass, evenly distributed key-recesses are formed in the surface of the glass without detrimentally affecting its transparency or its apparent smooth surface. The acid is allowed to act for ten minutes after which the gauze is removed and all acid and wax washed from the glass such as with methylated spirit. The photographic or printed film of the usual gelatine material having a suitable design formed thereon by a photographic, printing or other process and carried by a flexible backing or carrier medium such as that used with ordinary photographic films is soaked in an adhesive solution which is heated to 85° C. This solution conveniently comprises the following ingredients:

40% Pure animal glue.
40% Gum arabic.
20% Synthetic resin.
1 cc. Dilute sulphuric acid (1% solution) to each pint of above.

The gelatine film to be applied to the glass is laid in the above solution for two minutes. The glass sheet pitted as aforedescribed is wiped over with a 2% sulphuric acid solution, and the glass sheet is heated to be at a temperature of 80° C. The gelatine film transferred from the above adhesive solution is applied to the glass sheet with the backing or carrier medium on the outside that is to say with the side of the film with the illustration or representation thereon applied to the face of the glass sheet and the whole is passed between soft rubber rollers at a pressure of preferably not less than 11 lbs. per square inch and preferably at a speed not less than 1 inch in 5 seconds. Air between the gelatine film and glass is dispelled and the gelatine is pressed into the recesses. The glass sheet with the gelatine film thereon is placed in a chamber heated to 80° centigrade which ensures that the recesses are filled and forms a process for hardening the resin in the adhesive so that such hardened substance forms a key holding the film on the pitted glass plate and also hardens the film. The temperature of the treated plate is then reduced at the rate of 30° C. per hour until normal temperature is reached, and is allowed to stay for 48 hours at normal temperature. The backing or carrier medium for the film need not be detached from the film but may be left on the film for protective purposes. The film and backing may be similar to an ordinary photographic film and may have any actual coloured representation of a piece of wood, so that the sheet of glass presents the appearance of being laid on a piece of wood. Whilst the film flows to fill up the key-recesses in the glass sheet, the flow is sufficiently small that the appearance of the representation of wood or other representation on the film is not affected. The film is firmly fixed to the glass surface and as it is moulded and fixed in the key-recesses there is no liability of the film peeling or separating from the glass.

Having thus described the invention, what is claimed as new and desired to be secured by Letters Patent is:

A process of fixing, on a glass plate, a gelatine film having a photographic, printed or like illustration or representation on the face applied to the plate, in which the surface of the glass is finely pitted to form keying recesses of a size which will not apparently distort the illustration or representation moulded thereon and so that the smoothness of the glass surface or transparency of the glass is not affected, soaking the said film in a heated liquid adhesive containing resin, applying the side of the gelatine film with the illustration or representation thereon thus treated with the adhesive to the pitted surface of the glass and pressing the same thereon, and then treating the film covered glass by heat to harden the resin contained in the adhesive.

LESLIE ROBERT DOVER BECK.

REFERENCES CITED

The following references are of record in the file of this patent:

UNITED STATES PATENTS

| Number | Name | Date |
| --- | --- | --- |
| 1,888,344 | Bon | Nov. 22, 1932 |
| 2,122,178 | Land | June 28, 1938 |
| 2,421,607 | Fowler | June 3, 1947 |
| 2,499,452 | Bonnet | Mar. 7, 1950 |
| 2,518,695 | Jelley | Aug. 15, 1950 |